Patented Feb. 13, 1934

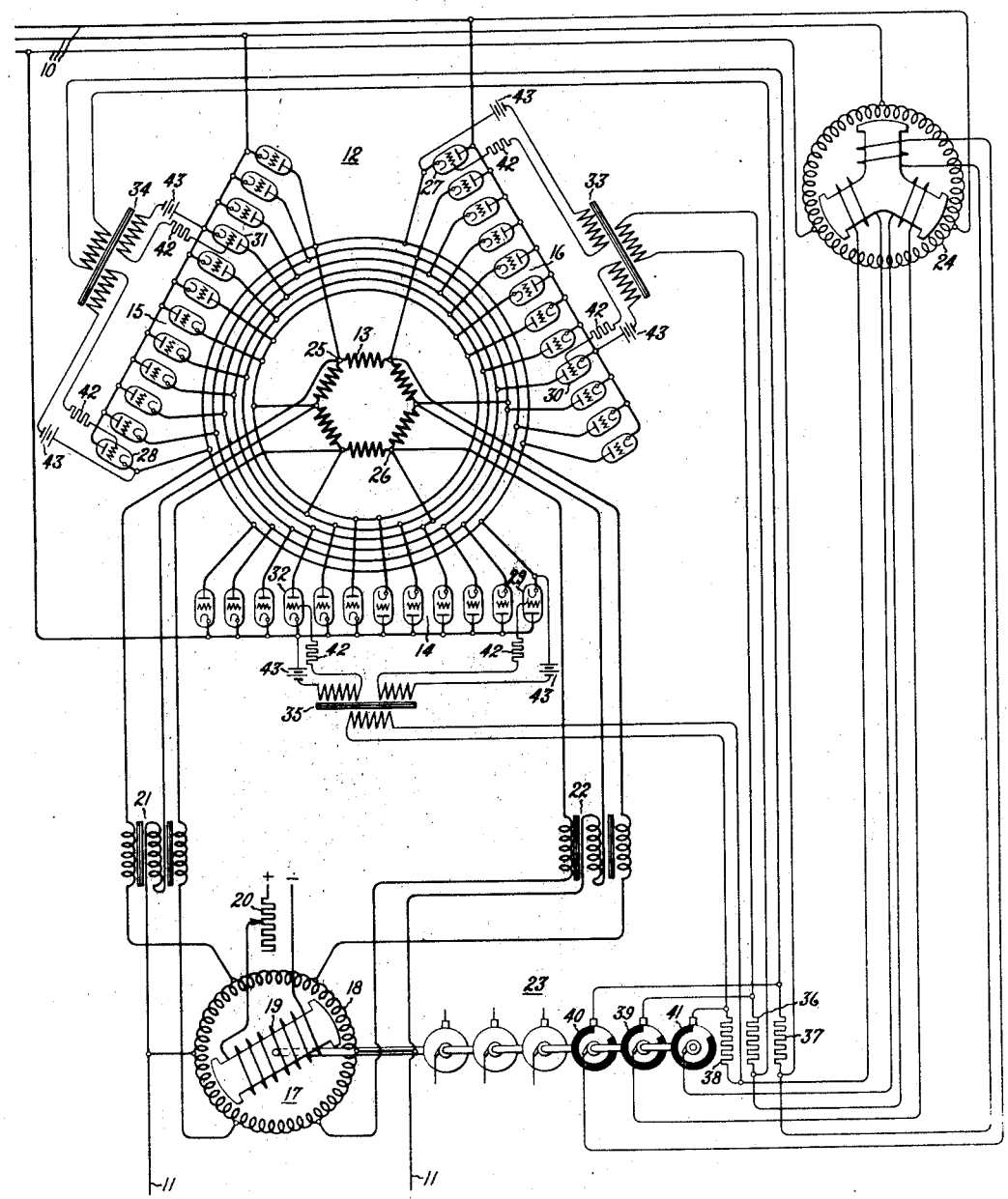

1,947,238

UNITED STATES PATENT OFFICE 1,947,238

SYSTEM OF ELECTRICAL DISTRIBUTION

Clodius H. Willis, Princeton, N. J., assignor to General Electric Company, a corporation of New York Application May 28, 1932. Serial No. 614,177

3 Claims. (Cl. 172—281)

My invention relates to systems of electrical distribution, and more particularly to such systems adapted to transmit energy between a substantially steady power circuit and a single phase alternating current circuit. While my invention is of general application, it is particularly useful in connection with the transmission of power between single phase and polyphase alternating current circuits by means of electric valve frequency changers.

Heretofore, there have been proposed numerous arrangements for transmitting energy between direct and alternating current circuits or between independent alternating current circuits of the same or different frequencies. The use of electric valve converting apparatus for this purpose is particularly advantageous because the magnitude and direction of the transmission of power between the two circuits may be readily controlled. When transmitting energy between single phase and direct current or polyphase alternating current circuits, however, some difficulty has been experienced due to the fact that power delivered by or consumed by a single phase alternating current circuit is inherently pulsating in its nature, while for optimum operating conditions on a direct current or polyphase alternating current circuit, it is essential that the flow of power be substantially steady. When energy is exchanged between two alternating current systems by means of rotating dynamo-electric machines, the inertia of the rotating masses is effective to absorb and release the momentary differences between the pulsating power of the single phase system and the steady power of the polyphase system. In the use of electric valve frequency changers, however, and other similar static equipment, the system is substantially inertialess, that is, there is no energy storage element for absorbing and releasing any considerable portion of the momentary differences in power. In the copending application of Max Stohr, Serial No. 614,203, filed May 28, 1932. and assigned to the same assignee as the present application, there is disclosed one arrangement utilizing an electric valve frequency changer which tends to overcome the above mentioned disadvantages of the arrangements of the prior art, in which energy is transmitted between the polyphase alternating current circuit and an intermediate polyphase alternating current circuit by means of an electric valve frequency changer, while the intermediate polyphase alternating current circuit is interconnected with the single phase alternating current circuit through a rotary phase converter. The interposition of the electric valve frequency changer permits the complete independence of the frequencies of the two systems so that either may vary with respect to the other. My invention constitutes an improvement upon the arrangement disclosed in the aforementioned application, which broadly claims the basic system described in the present application.

It is an object of my invention, therefore, to provide an improved system of electrical distribution for transmitting energy between a substantially steady power circuit and a single phase alternating current circuit which will overcome the above mentioned disadvantages of the arrangements of the prior art and which will be simple and reliable in operation. It is another object of my invention to provide an improved system of electrical distribution including an electric valve converting apparatus for transmitting energy between a substantially steady power circuit and a single phase alternating current circuit in which there is provided means for absorbing and releasing the momentary differences in power between the two circuits.

In accordance with one embodiment of my invention a substantially steady power circuit, such for example as a polyphase alternating current circuit, is connected to supply energy to a variable frequency single phase alternating current circuit through an electric valve converting apparatus. Interposed between the electric valve converting apparatus and the single phase alternating current circuit is a rotary phase converter provided with a polyphase armature winding having six symmetrically spaced terminals for connection to the polyphase output circuit of the electric valve converting apparatus and a pair of electrically spaced terminals for connection to the single phase alternating current circuit. The rotary phase converter interposed in the system is preferably provided with substantial inertia and tends to absorb and release the momentary differences between the pulsating power, characteristic of the single phase system, and substantially steady power which it is desired to maintain on the supply circuit. In accordance with my invention, the single phase power pulsations are still more effectively suppressed from the polyphase supply circuit by means of a pair of reactance devices provided with windings included in the connections between the valve converting apparatus and the rotary phase converter. Each reactance device has a single phase magnetic core and three windings, the connections of the windings in the several phases being such that, for a balanced polyphase load, the resultant magnetization of the devices is substantially zero. In this manner any single phase pulsating power which tends to flow back through the valve converting apparatus is opposed by the full magnetizing impedance of the two reactance devices.

For a better understanding of my invention, together with other and further objects thereof, reference is had to the following description taken in connection with the accompanying drawing and its scope will be pointed out in the appended claims. The single figure of the accompanying drawing illustrates an arrangement embodying my invention for transmitting energy from a three phase alternating current supply circuit to a variable frequency single phase alternating current load circuit.

Referring now to the drawing, I have illustrated a system of distribution embodying my invention for transmitting energy from a polyphase alternating current supply circuit 10 to a single phase alternating current circuit 11, which may have any desired constant or variable frequency. This system includes an electric valve frequency changer, which may be of any of the several types well known in the art, although I have illustrated, by way of example, a valve frequency changer in which each of the terminals of the load circuit is interconnected with each of the terminals of the alternating current supply circuit through a pair of oppositely connected electric valves, so that current may flow either into or out of any terminal of the load circuit to or from any terminal of the supply circuit. For example, the valve converting apparatus 12 comprises a six phase inductive network 13 the several terminals of which are connected to the three terminals of the supply circuit 10 through the groups of electric valves 14, 15 and 16, each group comprising six pairs of oppositely connected valves, one pair for each terminal of the network 13. The terminals of the inductive network 13 are connected to energize the polyphase armature winding 18 of a rotary phase converter 17 illustrated as a synchronous converter provided with rotatable field winding 19 energized from any suitable source of direct current through a variable resistor 20, as is well understood by those skilled in the art. Each of the several valves of the groups 14, 15 and 16 is provided with an anode, a cathode, and a control grid and may be of any of the several types well known in the art, although I prefer to use valves of the vapor electric discharge type. The alternating current circuit 11 is connected to diametrically opposite terminals of the armature winding 18. A pair of reactance devices 21 and 22 are interposed in the connections between the inductive network 13 and the armature winding 18 of the phase converter 17. Each of the devices 21 and 22 comprises a single phase magnetic core member with three inductive windings thereon, the three windings being included in the connections to three adjacent terminals of the network 13 and that winding included in the middle connection being reversed in polarity with respect to the others, with the result that each of the devices is magnetized with three currents symmetrically spaced 120 electrical degrees which, under balanced load conditions, gives a resultant magnetization of zero.

In order successively to transfer the input current to the inductive network 13 between its several terminals, the grids of the several electric valves are adapted to receive a positive excitation during the intervals in which current flows into or out of their associated terminals; for example, the grids of the several electric valves may be excited through a distributor 23 driven at a speed corresponding to the frequency which it is desired to supply to the alternating current circuit 11. If the alternating current circuit 11 is connected to an independent source of electromotive force for determining its frequency and phase relation, the distributor 23 may be connected directly to the rotating member of the phase converter 17, as illustrated. In case it is desired to regulate the amount of energy transferred from the circuit 10 to the circuit 11, the grids of each of the several electric valves may receive an alternating component of the frequency of the circuit 10, but variable in phase with respect thereto, as for example, by exciting them directly from the circuit 10 through a rotary phase shifting transformer 24. For example, if, at a particular instant, current is entering the terminal 25 and leaving the terminal 26 of the network 13, the grids of electric valves 27, 28 and 29 will be excited from the secondary windings of their respective grid transformers 33, 34 and 35, to render these valves conductive and thus supply unidirectional current from the three phase circuit 10. The primary windings of the grid transformers 33, 34 and 35 are excited with the potentials across resistors 36, 37 and 38, which in turn are energized through the sections 39, 40 and 41, respectively, of the distributor 23 from the phase of the rotary phase shifting transformer 24. The connections are such that the grid of each valve receives an alternating potential of a phase corresponding to that phase of the supply circuit 10 to which the respective valve is connected. Similarly, the current will leave the terminal 26 of the network 13 through the electric valves 30, 31, and 32, the grids of which are energized from additional secondary windings of the transformers 33, 34 and 35, respectively. Current limiting resistors 42 and negative bias batteries 43 are preferably included in the several grid circuits. For the sake of simplicity the grid circuits of the other electric valves have been omitted, but it will be obvious to those skilled in the art that the valves associated with each of the terminals of the network 13 will be excited through grid transformers energized from other sections of the distributor 23 in the proper sequence.

The general principles of operation of the above described electric valve frequency changing apparatus will be well understood by those skilled in the art. In brief, under the conditions assumed above, the electric valves 27—28—29 and 30—31—32 will act as a three phase full wave rectifier supplying unidirectional current along the axis 25—26 of the inductive network 13. By properly adjusting the phase of the grid excitation by means of the rotary phase shifting transformer 24, the average power delivered to the network 13 may be readily controlled in a well known manner. Substantially 60 electrical degrees after the assumed time, the rotor 19 of the phase converter 18 will have moved to a position such that the energizing circuits of the resistors 36—37—38 are broken and the grid transformers 33—34—35 are deenergized. Under these conditions the negative bias batteries 43 in the several grid circuits render the groups of valves 27—28—29 and 30—31—32 non-conductive. At the same instant energizing circuits will be completed through other sections of the distributor and other grid transformers (not shown) for the groups of valves associated with the next successive terminals of the inductive network 13. In this manner the current will be successively commutated between the several terminals of inductive network 13 and a polyphase alternating current will flow in the several windings thereof. The terminal voltage of the network 13 is impressed upon the armature winding 18 of the synchronous phase converter 17, from the diametrical terminals of which the single phase alternating current circuit 11 is energized. As explained in the aforementioned application, the inertia of the rotating member 19 of the converter 18 is effective to absorb and release momentary differences in power between the single phase circuit 11 and the three phase circuit 10. By properly adjusting the resistor 20 which regulates the excitation of the converter 18, it may serve also to control the power factor of the current drawn from the alternating current circuit 10. However, the phase converter 18 may not be effective to completely compensate for the momentary differences in power between the single phase circuit 11 and the three phase circuit 10. In such case, single phase energy would flow back through one winding of each of the reactance devices 21 and 22 and through the inductive network 13. However, as stated above, the reactance devices 21 and 22 are so connected that their normal resultant magnetomotive force is substantially zero, while any unbalanced current flowing in a single winding of each of the reactance devices will be opposed by the full magnetizing impedance of these two devices. In this manner, any flow of single phase energy is substantially suppressed from the electric valve converting apparatus and three phase alternating current circuit 10.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is,—

1. A system of electrical distribution comprising a substantially steady power circuit, a single phase alternating current circuit, an intermediate polyphase alternating current circuit, an electric valve converting apparatus for transmitting energy between said steady power circuit and said polyphase circuit, a rotary phase converter interconnecting said polyphase and single phase circuits for substantially absorbing and releasing instantaneous differences between the steady power of said power circuit and the pulsating power of said single phase system, and a polyphase reactance device interposed between said power circuit and said single phase circuit to prevent the flow of single phase power through said valve converting apparatus.

2. A system of electrical distribution comprising a substantially steady power circuit, a variable frequency single phase alternating current circuit, an intermediate polyphase alternating current circuit of the frequency of said single phase circuit, an electric valve converting apparatus for transmitting energy between said steady power circuit and said polyphase circuit, a rotary phase converter interconnecting said polyphase and single phase circuits, and a reactance device provided with a plurality of windings interposed in the connections between said polyphase circuit and said single phase circuit, the connections of said windings being such that a balanced load in said polyphase circuit produces substantially zero resultant magnetization of said reactance device.

3. A system of electrical distribution comprising a polyphase alternating current supply circuit, a variable frequency single phase alternating current load circuit, an intermediate six phase alternating current circuit of the frequency of said single phase circuit, an electric valve converting apparatus for transmitting energy from said supply circuit to said intermediate circuit, a rotary phase converter interconnecting said six phase and single phase circuits, and a pair of reactance devices, each provided with three windings interposed in three adjacent phase connections to said rotary converter, said windings being so connected that, under balanced load conditions on said polyphase circuit, the resultant magnetization of said devices is substantially zero.

CLODIUS H. WILLIS.